(12) United States Patent
Fujihara

(10) Patent No.: US 7,096,211 B2
(45) Date of Patent: Aug. 22, 2006

(54) APPARATUS AND METHOD FOR IMAGE/POSITION DISPLAY

(75) Inventor: Masahiro Fujihara, Tokyo (JP)

(73) Assignee: Sony Corporation, Tokyo (JP)

( * ) Notice: Subject to any disclaimer, the term of this patent is extended or adjusted under 35 U.S.C. 154(b) by 599 days.

(21) Appl. No.: 09/727,215

(22) Filed: Nov. 30, 2000

(65) Prior Publication Data

US 2002/0054162 A1 May 9, 2002

(30) Foreign Application Priority Data

Dec. 3, 1999 (JP) ................................ 11-344395

(51) Int. Cl.
G06F 17/00 (2006.01)
(52) U.S. Cl. ........................... 706/98; 706/59; 715/540
(58) Field of Classification Search ............ 706/57–59; 345/638, 133, 619, 700–867, 961–978, 621; 345/625, 650; 715/500, 540–542

See application file for complete search history.

(56) References Cited

U.S. PATENT DOCUMENTS

| | | | | |
|---|---|---|---|---|
| 5,499,294 A * | 3/1996 | Friedman | ...................... | 380/10 |
| 6,057,842 A * | 5/2000 | Knowlton et al. | ........... | 715/788 |
| 6,181,838 B1 * | 1/2001 | Knowlton | ................... | 382/305 |
| 6,269,446 B1 * | 7/2001 | Schumacher et al. | ....... | 713/176 |
| 6,282,362 B1 * | 8/2001 | Murphy et al. | ............... | 386/46 |
| 6,400,996 B1 * | 6/2002 | Hoffberg et al. | .............. | 700/83 |
| 6,437,797 B1 * | 8/2002 | Ota | ............................. | 345/638 |
| 6,445,834 B1 * | 9/2002 | Rising, III | .................. | 382/305 |
| 6,504,571 B1 * | 1/2003 | Narayanaswami et al. | ..................... | 348/231.99 |
| 6,507,371 B1 * | 1/2003 | Hashimoto et al. | ......... | 348/552 |
| 6,510,379 B1 * | 1/2003 | Hasegawa et al. | .......... | 701/202 |
| 6,691,282 B1 * | 2/2004 | Rochford et al. | ........... | 715/514 |
| 6,693,652 B1 * | 2/2004 | Barrus et al. | ................ | 715/838 |
| 6,701,099 B1 * | 3/2004 | Yokobori et al. | .............. | 399/45 |
| 6,763,148 B1 * | 7/2004 | Sternberg et al. | ........... | 382/293 |
| 6,798,427 B1 * | 9/2004 | Suzuki et al. | ................. | 84/662 |
| 6,883,146 B1 * | 4/2005 | Prabhu et al. | .............. | 715/854 |
| 6,957,205 B1 * | 10/2005 | Liongosari et al. | ........... | 706/45 |
| 6,993,718 B1 * | 1/2006 | Fujihara | ..................... | 715/530 |

OTHER PUBLICATIONS

Voisard, Desining an integarting user interfaces of geographic applications, ACM AVI, pp. 133-142, 1994.*

Burigat et al, "Visualizing the results of interactive queries for geographic data on mobile devices", ACM GIS, pp. 277-284, pp. 2005.*

(Continued)

Primary Examiner—Anil Khatri
(74) Attorney, Agent, or Firm—Oblon, Spivak, McClelland, Maier, & Neustadt, P.C.

(57) ABSTRACT

An information processing apparatus and an information processing method as well as a program storage medium by which a large amount of image data is managed readily and displayed plainly are disclosed. A film window and a map window are displayed on a display screen. Thumbnail icons corresponding to photograph image data are arranged in a time series, and thumbnail icons corresponding to image data picked up before and after image pickup of the photograph image data can be referred to by an operation of an upward scroll button or a downward scroll button. When a user clicks one of the thumbnail icons, a position representative of a place at which the photograph was taken is displayed at the center of the map window. When the user clicks one of the position icons, a thumbnail icon representative of the image data picked up at the place is displayed at the top of the film window.

9 Claims, 12 Drawing Sheets

OTHER PUBLICATIONS

Prabhakar et al, "Browsing and placement of multiresolution images on parallel disks", ACM IOPADS, pp. 102-113, 1997.*

Toyama et al, "Geographic location tags on digital images", ACM MM, pp. 156-166, 2003.*

* cited by examiner

| THUMBNAIL ID | ALTITUDE-LATITUDE | IMAGE PICKUP DATE-HOUR |
|---|---|---|
| XXX00013 | XX°XX'XX"/XX°XX'XX" | 1999/10/10·14:24 |
| XXX00014 | XX°XX'XX"/XX°XX'XX" | 1999/10/10·14:28 |
| | | |

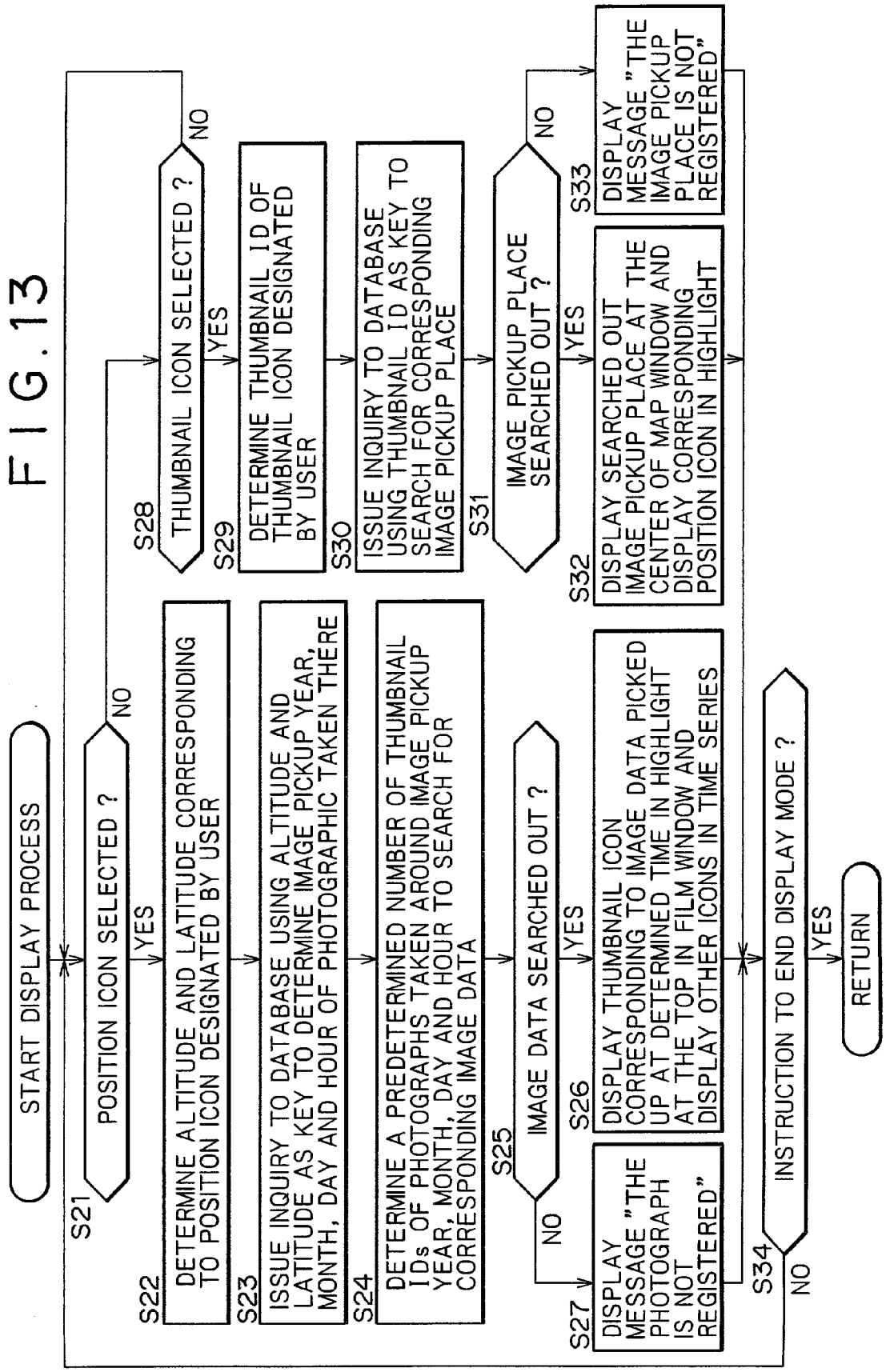

APPARATUS AND METHOD FOR IMAGE/POSITION DISPLAY

BACKGROUND OF THE INVENTION

This invention relates to an information processing apparatus and an information processing method as well as a program storage medium, and an information processing apparatus and an information processing method as well as a program storage medium by which a large amount of image data is managed and displayed.

In one of methods of managing photograph images stored as digital data, photograph images are managed as a combination of a map and photographs. A user stores picked up photograph images in a corresponding relationship to positions on a map into a storage medium. Then, when a point on the map at which a photograph was taken is designated, a photograph image picked up at the point designated by the user is displayed as a reduced image (hereinafter referred to as thumbnail icon) in the proximity of the designated point.

However, when a plurality of photographs were taken at one place, particularly where the number of photographs is great, it is difficult to plainly display a plurality of corresponding thumbnail icons on a screen.

SUMMARY OF THE INVENTION

It is an object of the present invention to provide an information processing apparatus and an information processing method as well as a program storage medium by which a large amount of image data is managed readily and displayed plainly.

In order to attain the object described above, according to the present invention, position information and time information are stored in a corresponding relationship to each of stored image data, and first or thumbnail icons corresponding to the image data, a map image and second or position icons indicative of positions on the map image are displayed in such a manner that the first and second icons are related to each other. Then, if one of the position icons is selected, then a corresponding one of the thumbnail icons is displayed distinctly. On the other hand, if one of the thumbnail icons is selected, then a corresponding one of the position icons is displayed distinctly.

More particularly, according to an aspect of the present invention, there is provided an information processing apparatus, comprising means for receiving a plurality of pieces of image information each of which has attribute data of time and a plurality of pieces of position information each of which has attribute data of time, and means for setting a corresponding relationship between the pieces of image information and the pieces of position information using the attribute data of time as a parameter.

According to another aspect of the present invention, there is provided an information processing method, comprising the steps of receiving a plurality of pieces of image information each of which has attribute data of time and a plurality of pieces of position information each of which has attribute data of time, and setting a corresponding relationship between the pieces of image information and the pieces of position information using the attribute data of time as a parameter.

According to a further aspect of the present invention, there is provided a program storage medium on which a computer-readable program is stored, the computer-readable program comprising the steps of receiving a plurality of pieces of image information each of which has attribute data of time and a plurality of pieces of position information each of which has attribute data of time, and setting a corresponding relationship between the pieces of image information and the pieces of position information using the attribute data of time as a parameter.

According to a still further aspect of the present invention, there is provided an information processing apparatus, comprising storage means for storing image data, first recording means for recording time information in a corresponding relationship to the image data, second recording means for recording position information in a corresponding relationship to the image data, first display control means for controlling display of first icons representative of the image data stored in the storage means in accordance with the time information recorded by the first recording means, second display control means for controlling display of a map image, and third display control means for controlling display of second icons representative of the position information recorded by the second recording means on the map image whose display is controlled by the second display control means, the second display control means controlling, when one of the first icons whose display is controlled by the first display control means is selected, the display of the map image based on the position information of the image data corresponding to the selected first icon recorded by the second recording means, the first display control means controlling, when one of the second icons whose display is controlled by the third display control means is selected, the display of the first icons based on the time information of the image data corresponding to the selected second icon recorded by the first recording means.

According to a yet further aspect of the present invention, there is provided an information processing method, comprising a storage control step of controlling storage of image data, a first recording control step of controlling recording of time information in a corresponding relationship to the image data, a second recording control step of controlling recording of position information in a corresponding relationship to the image data, a first display control step of controlling display of first icons representative of the image data stored by the processing of the storage control step in accordance with the time information whose recording is controlled by the processing of the first recording control step, a second display control step of controlling display of a map image, and a third display control step of controlling display of second icons representative of the position information recorded by the processing of the second recording step on the map image whose display is controlled by the processing of the second display control step, the second display control step controlling, when one of the first icons displayed by the processing of the first display control step is selected, the display of the map image based on the position information of the image data corresponding to the selected first icon recorded by the processing of the second recording control step, the first display control step controlling, when one of the second icons displayed by the processing of the third display control step is selected, the display of the first icons based on the time information of the image data corresponding to the selected second icon recorded by the processing of the first recording control step.

According to a yet further aspect of the present invention, there is provided a program storage medium on which a computer-readable program is stored, the computer-readable program comprising a storage control step of controlling storage of image data, a first recording control step of controlling recording of time information in a corresponding relationship to the image data, a second recording control step of controlling recording of position information in a corresponding relationship to the image data, a first display control step of controlling display of first icons representative of the image data stored by the processing of the storage control step in accordance with the time information whose recording is controlled by the processing of the first recording control step, a second display control step of controlling display of a map image, and a third display control step of controlling display of second icons representative of the position information recorded by the processing of the second recording step on the map image whose display is controlled by the processing of the second display control step, the second display control step controlling, when one of the first icons displayed by the processing of the first display control step is selected, the display of the map image based on the position information of the image data corresponding to the selected first icon recorded by the processing of the second recording control step, the first display control step controlling, when one of the second icons displayed by the processing of the third display control step is selected, the display of the first icons based on the time information of the image data corresponding to the selected second icon recorded by the processing of the first recording control step.

In the information processing apparatus and the information processing method and the program storage medium, thumbnail icons representative of image data and position icons representative of positions on a map are displayed in a corresponding relationship to each other. When one of the position icons is selected, a corresponding one of the thumbnail icons is displayed distinctly, but when one of the thumbnail icons is selected, a corresponding one of the position icons is displayed distinctly. Consequently, a large amount of image data can be managed readily and displayed plainly.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 13 is a flow chart illustrating a display process.

DETAILED DESCRIPTION OF THE PREFERRED EMBODIMENT

Figure 1:
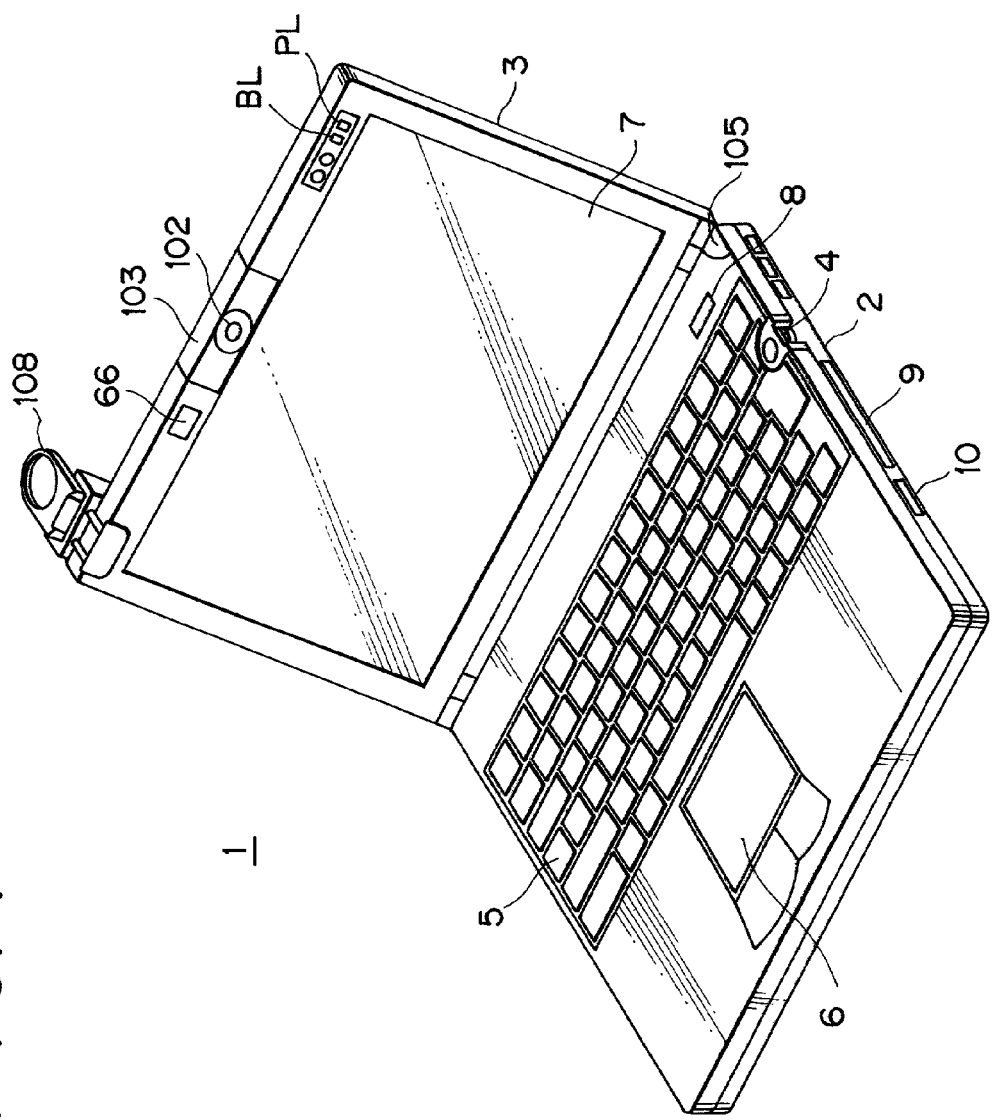
FIG. 1 is a perspective view showing an appearance of a personal computer to which the present invention is applied.
Figure 2:
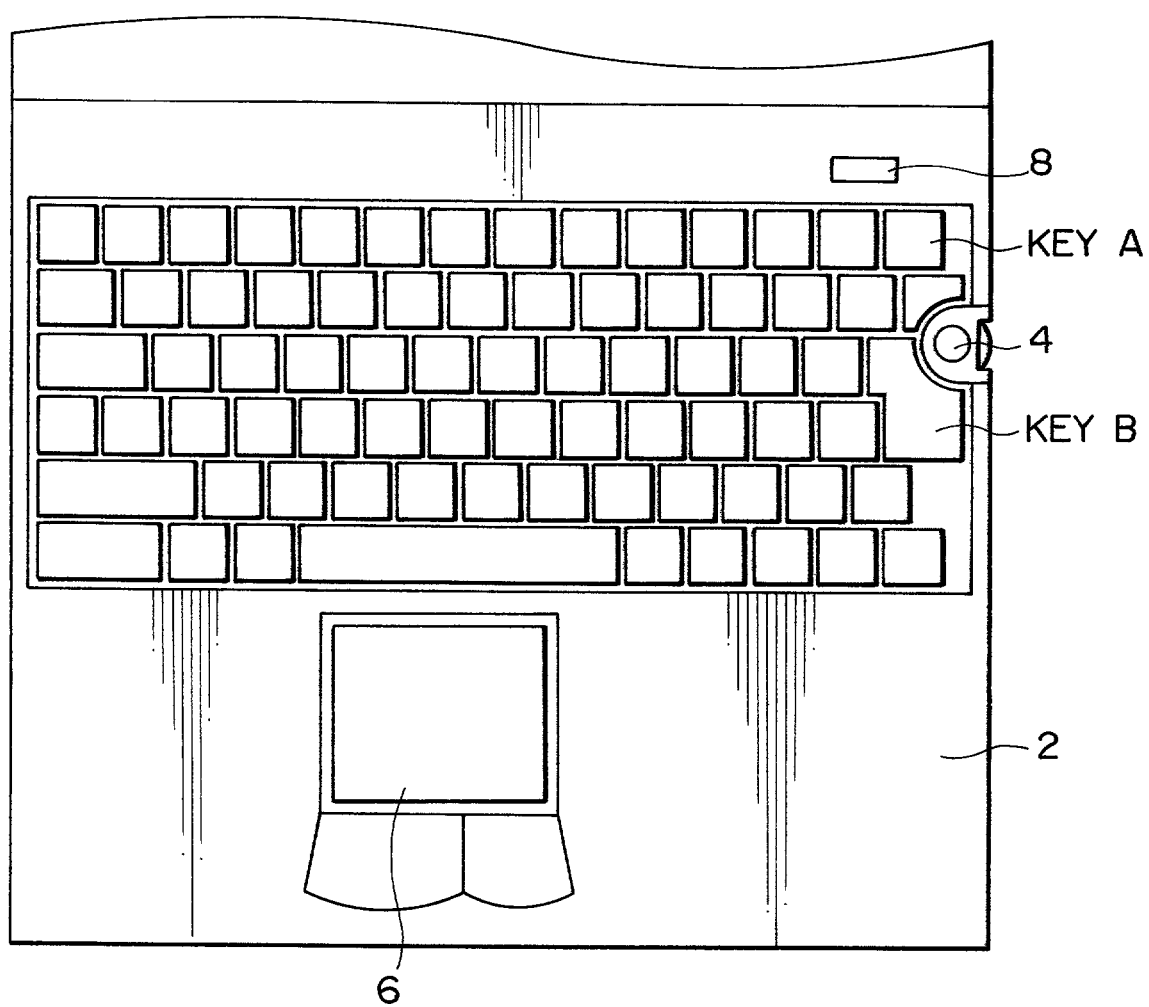
FIG. 2 is a top plan view of a body of the personal computer of FIG. 1.
Figure 3:
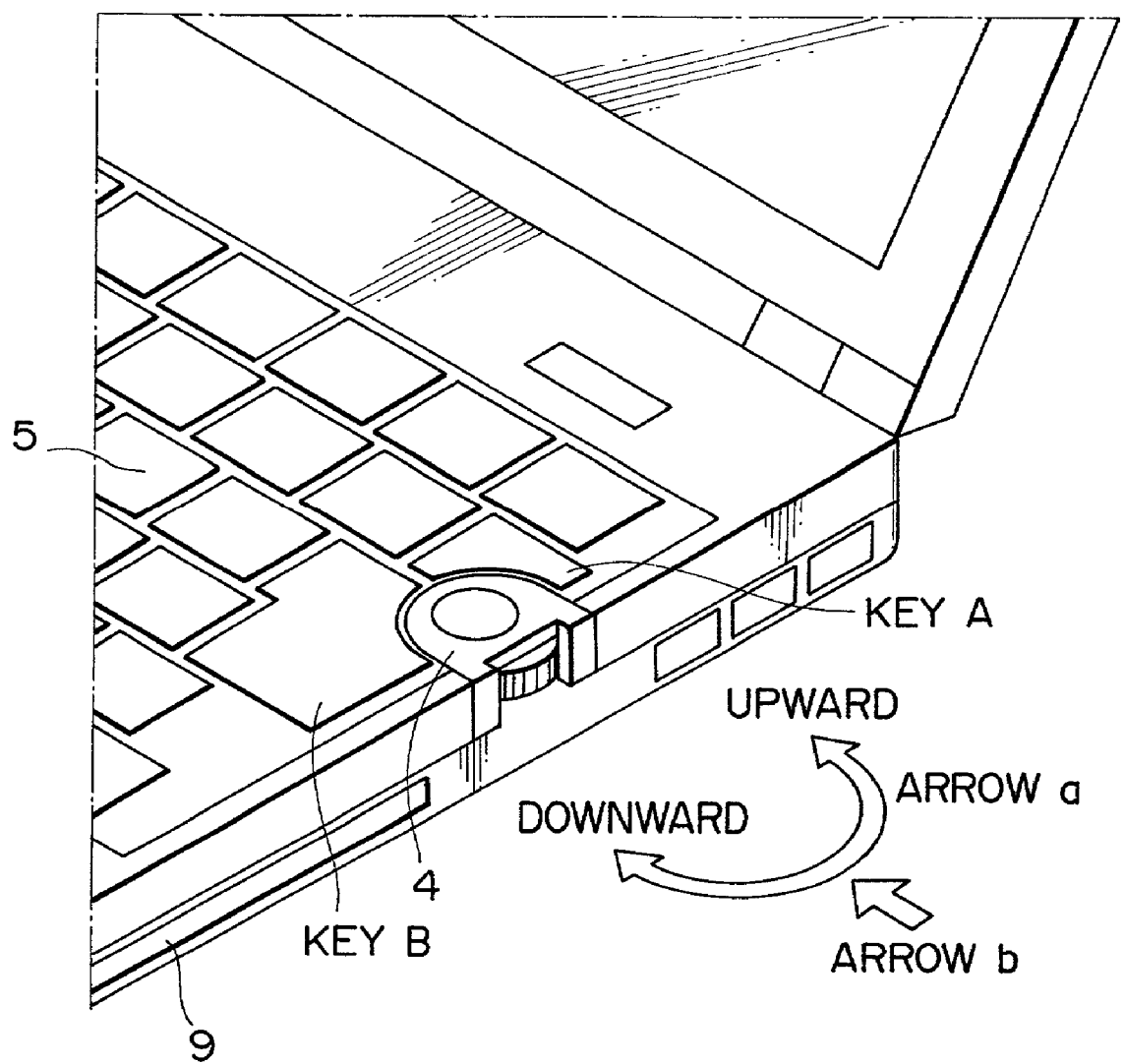
FIG. 3 is an enlarged view of a jog dial and elements therearound of the personal computer of FIG. 1.
Figure 4:
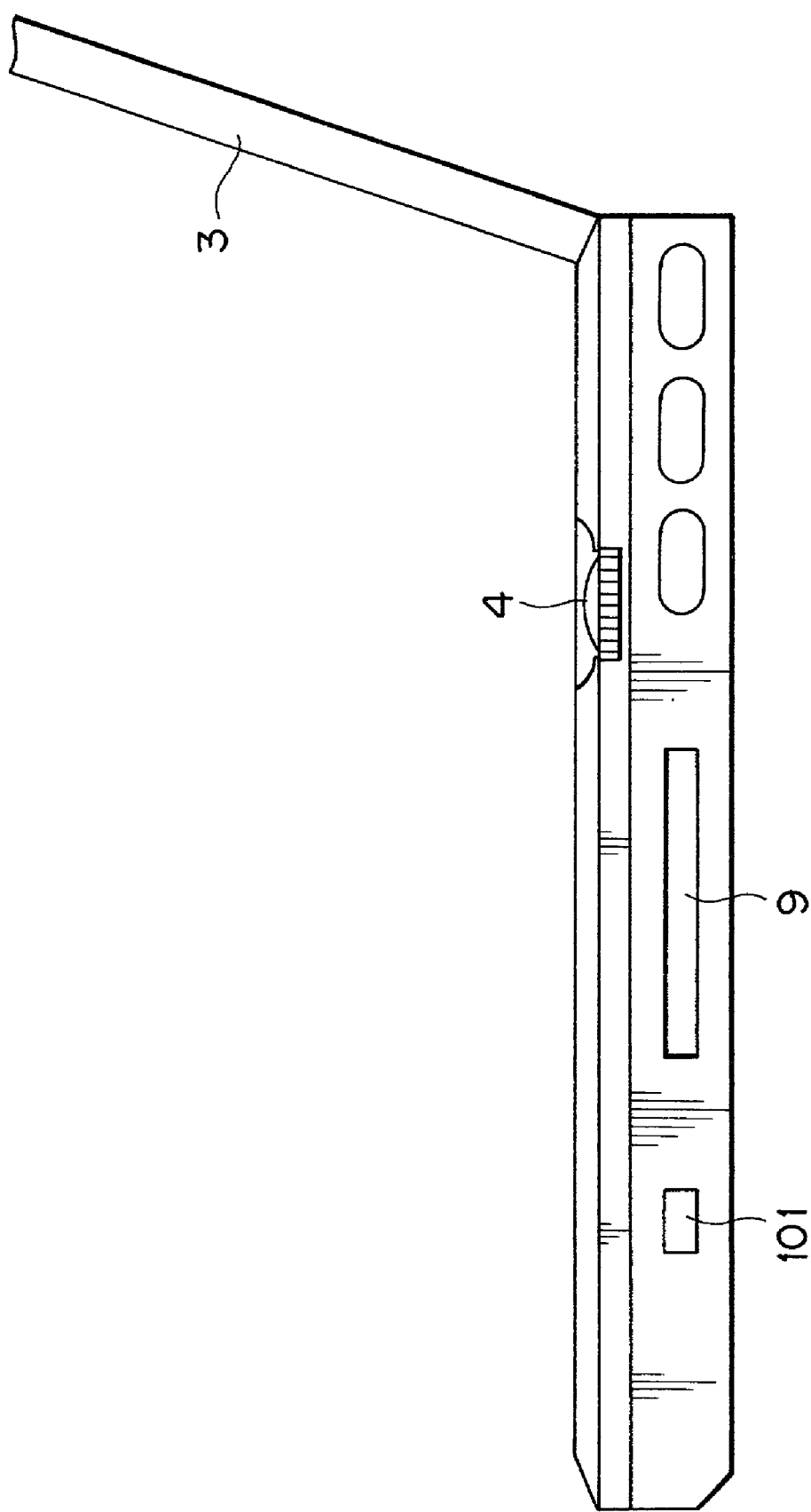
FIG. 4 is a right side elevational view showing a construction of a right-hand side face of the personal computer of FIG. 1.

FIGS. 1 to 4 show an appearance of a notebook type personal computer to which the present invention is applied. The notebook type personal computer shown is generally denoted at 1 and basically includes a body 2 and a display section 3 mounted for pivotal opening and closing movement on the body 2. FIG. 1 is a perspective view showing how the display unit 3 is typically opened away from the main body 2. FIG. 2 is a plan view of the main body 2. FIG. 3 is an enlarged view of a jog dial 4 (described later) attached to the main body 2. FIG. 4 is a side view of the jog dial 4 furnished on the main body 2.

A keyboard 5 which is operated to input various characters, symbols and so forth, a touch pad 6 serving as a pointing device which is operated to move a pointer or mouse cursor, and a power supply switch 8 are provided on an upper face of the body 2. A jog dial 4, an IEEE 1394 input/output port 101 and so forth are provided on a side face of the body 2. The touch pad 6 may be replaced typically by a pointing device of the stick type.

A LCD (Liquid Crystal Display) unit 7 for displaying an image thereon is provided on the front face of the display section 3. A power supply lamp PL and a battery lamp BL are provided at a right upper portion of the display section 3. When necessary, also a message lamp ML and some other lamp or lamps each in the form of an LED are provided at the right upper portion of the display section 3. A CCD (Charge-Coupled Device) video camera 102 including a CCD and a microphone 104 are provided at a central portion of an upper portion of the display section 3. A shutter button 105 for the CCD video camera 102 is provided at a right upper end portion of the body 2. The CCD video camera 102 is mounted on a rotational movement mechanism 103 that rotatably moves a lens section not shown in FIGS. 1 to 4 of the CCD video camera 102 with respect to the display section 3. It is to be noted that the power supply lamp PL, battery lamp BL, message lamp ML and like lamps may alternatively be provided at a lower portion of the display section 3.

The jog dial 4 is incorporated between keys of the keyboard 5 on the body 2 and mounted such that it has a height substantially in level with the keys. The jog dial 4 is used to execute a predetermined process in response to a rotational operation thereof indicated by an arrow mark a in FIG. 3 and execute another process in response to a moving operation thereof indicated by an arrow mark b. It is to be noted that the jog dial 4 may be disposed alternatively on the left-hand side face of the body 2 or otherwise on the left-hand side face or the right-hand side face of the display section 3 on which the LCD unit 7 is provided, or disposed in a vertical direction between the key for the character G and the key for the character H of the keyboard 5. As another alternative, the jog dial 4 may be disposed at a central portion of the front face of the body 2 or disposed in a horizontal direction along an upper edge or a lower edge of the touch pad 6 or else disposed in a vertical direction between the right button and the left button of the touch pad 6 such that it can be operated by the thumb while the touch pad 6 is operated with the forefinger of the same hand. As a further alternative, the jog dial 4 may be disposed not in a vertical direction or in a horizontal direction but in an oblique direction with a predetermined angle in which it can be operated readily with a finger. As a still further alternative, the jog dial 4 may be disposed at a position of a side face of a mouse as a pointing device at which it can be operated with the thumb.

Figure 5:
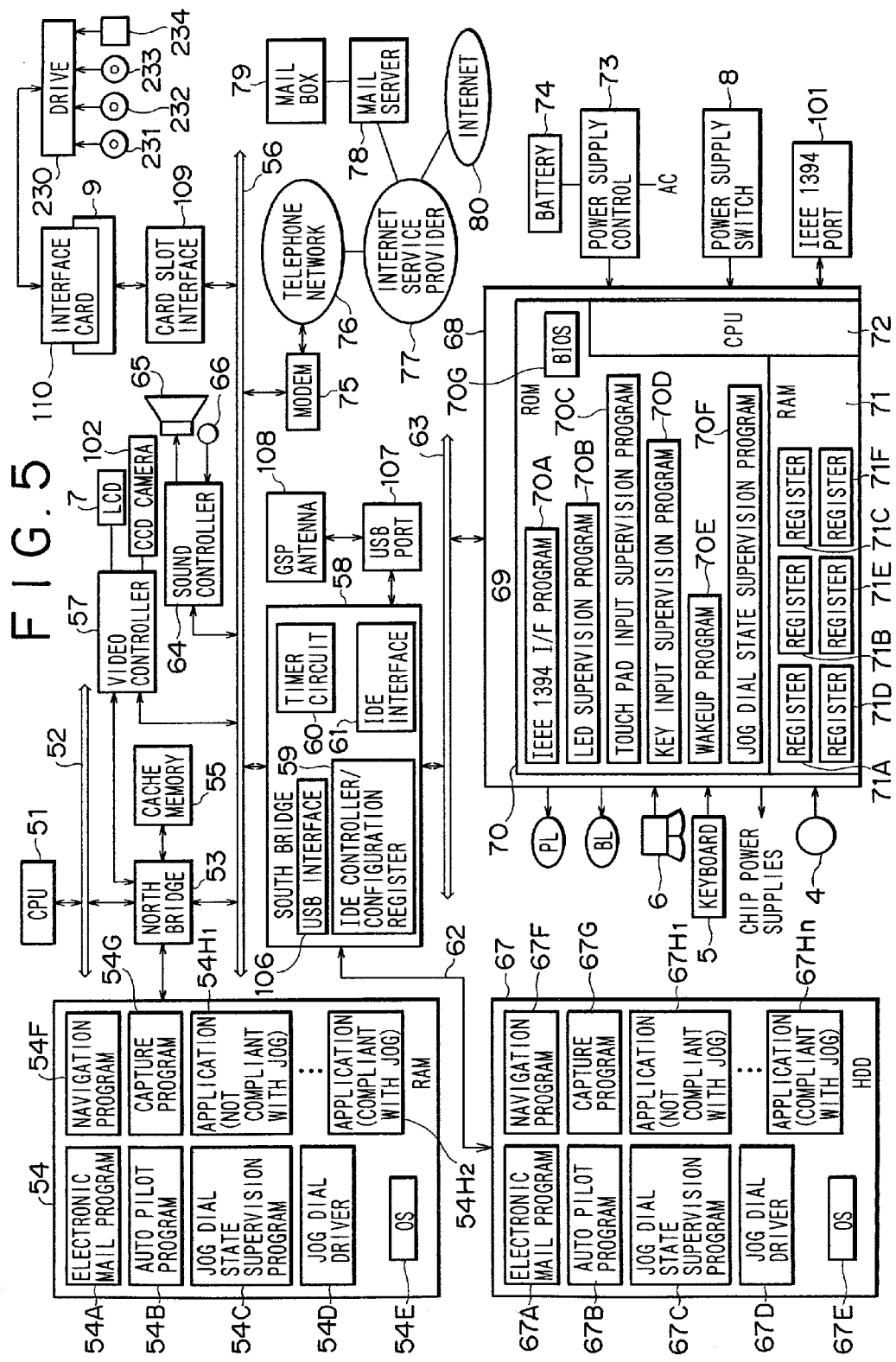
FIG. 5 is a block diagram showing an example of an internal construction of the personal computer of FIG. 1.

FIG. 5 shows an electric construction of the notebook type personal computer 1.

Referring to FIG. 5, a CPU (Central Processing Unit) 51 is formed typically from a Pentium (trademark) processor by Intel and connected to a host bus 52. Also a north bridge 53 is connected to the host bus 52. The north bridge 53 is connected also to an AGP (Accelerated Graphic Port) 50 and a PCI bus 56. The north bridge 53 is formed typically from the 400BX by Intel and controls elements around the CPU 51 and a RAM 54. The north bridge 53 is further connected to a video controller 57 through the AGP 50. The north bridge 53 and a south bridge 58 form a chip set.

The north bridge 53 is connected also to the RAM (Random Access Memory) 54 and a cache memory 55. The cache memory 55 caches data to be used by the CPU 51. It is to be noted that, though not shown, also the CPU 51 has a primary cache memory built therein.

The RAM 54 is formed typically from a DRAM (Dynamic Random Access Memory) and stores programs to be executed by the CPU 51 and data necessary for operation of the CPU 51. More particularly, when startup of the notebook type personal computer 1 is completed, for example, an electronic mail program 54A, an auto pilot program 54B, a jog dial state supervision program 54C, a jog dial driver 54D, an OS 54E, a navigation program 54F, a capture program 54G and other application programs 54H1 to 54Hn are transferred from a HDD (Hard Disk Drive) 67 to and stored into the RAM 54.

The electronic mail program 54A is used to transmit or receive a communication statement through a network to or from a communication circuit such as a telephone line 76 through a modem 75. The electronic mail program 54A has a terminating mail acquisition function as a specific function. The terminating mail acquisition function executes a process of confirming from a mail server 78 provided in an Internet service provider 77 whether or not a mail destined for a user of the notebook type personal computer 1 is terminated in a mail box 79 of the mail server 78 and acquiring, if a mail destined for the user is terminated, the mail.

The auto pilot program 54B is used to successively start up a plurality of processes (or programs) set in advance in an order set in advance to effect necessary processing.

The OS (Operation System, basic program software) 54E is a system for controlling basic operation of the computer as represented typically by the Windows 95 (trademark) or the Windows 98 (trademark) by Microsoft or the Mac OS (trademark) by Apple Computer.

The jog dial state supervision program 54C operates to receive from any of the application programs 54H1 to 54Hn a notification of whether or not the application program is ready for a jog dial and display, if the application program is ready for a jog dial, operations which can be executed by an operation of the jog dial 4 to the user using a user interface function which the application has. The jog dial state supervision program 54C is normally in a state in which it waits for an event of the jog dial 4 and has a list for receiving a notification from an application program. The jog dial driver 54D executes various functions in response to an operation of the jog dial 4.

The video controller 57 is connected to the PCI bus 56 and further connected to the north bridge 53 through the AGP 50. The video controller 57 controls the display of the LCD unit 7 based on data supplied thereto through the PCI bus 56 or the AGP 50 and sends video data from the CCD video camera 102 to the PCI bus 56 or the north bridge 53.

A sound controller 64 is connected to the PCI bus 56 and fetches a sound input from a microphone 66 or supplies a sound signal to a speaker 65. Also the modem 75 and a card slot interface 109 are connected to the PCI bus 56.

The modem 75 can be connected to a communication network 80 such as the Internet, the mail server 78 and so forth through the telephone line 76 and the Internet service provider 77. In order to allow addition of an optional function, an interface card 110 is inserted suitably into a slot 9 connected to the card slot interface 109 so that data can be communicated with an external apparatus. For example, a drive 230 can be connected to the interface card 110. In this instance, data can be communicated with a magnetic disk 231, an optical disk 232, a magneto-optical disk 233, a semiconductor memory 234 or the like loaded in the drive 230.

Also the south bridge 58 is connected to the PCI bus 56. The south bridge 58 is formed typically from the PIIX4E by Intel and controls various inputs and outputs. In particular, the south bridge 58 includes an IDE (Integrated Drive Electronics) controller/configuration register 59, a timer circuit 60, an IDE interface 61, and a USB (Universal Serial Bus) interface 106. The south bridge 58 controls a device connected to an IDE bus 62, a device connected to a USB port 107 or another device connected through an ISA/EIO (Industry Standard Architecture/Extended Input Output) bus 63 and an embedded controller 68.

For example, if a GPS (Global Positioning System) antenna 108 is loaded in the USB port 107, then radio waves from GPS satellites are received by the GPS antenna 108 so that current position data are obtained. The USB interface 106 sends the current position data (altitude data, longitude data and height data) received through the GPS antenna 108 to the CPU 51 through the PCI bus 56, north bridge 53 and host bus 52.

The IDE controller/configuration register 59 includes two IDE controllers including a primary IDE controller and a secondary IDE controller, a configuration register and so forth.

The primary IDE controller is connected to a connector not shown over the IDE bus 62, and the HDD 67 is connected to the connector. The secondary IDE controller can be connected to an external apparatus over another IDE bus not shown.

The HDD 67 has stored therein an electronic mail program 67A, an auto pilot program 67B, a jog dial state supervision program 67C, a jog dial driver 67D, an OS 67E (basic program software), a navigation program 67F, a capture program 67G and a plurality of other application programs 67H1 to 67Hn as well as data and so forth used by the programs. The programs 67A to 67Hn stored in the HDD 67 are successively transferred to and stored into the RAM 54 in the course of a startup (boot-up) process. Image management software is installed in the application 67H1.

Further, the embedded controller 68 is connected to the ISA/EIO bus 63. The embedded controller 68 is an I/O controller formed from a microcontroller. In particular, the embedded controller 68 includes an I/O interface 69, a ROM 70, a RAM 71 and a CPU 72 connected to one another.

The ROM 70 has stored in advance therein typically an IEEE 1394 I/F (Interface) program 70A, an LED control program 70B, a touch pad input supervision program 70C, a key input supervision program 70D, a wakeup program 70E, and a jog dial state supervision program 70F.

The IEEE 1394 I/F program 70A is used to input and output data compliant with the IEEE 1394 which are communicated through the IEEE 1394 input/output port 101. The LED control program 70B is used to control lighting of lamps including the power supply lamp PL, battery lamp BL, message lamp ML when necessary and other LEDs. The touch pad input supervision program 70C is used to supervise inputting by a user using the touch pad 6. The key input supervision program 70D is used to supervise inputting by a user using the keyboard 5 and other key switches. The wakeup program 70E is used to check, based on current time data supplied thereto from the timer circuit 60 in the south bridge 58, whether or not a preset time comes, and manage required chip power supplies to start up a predetermined process (or program) when the preset time comes. The jog dial state supervision program 70F is used to normally supervise rotation or depression of a rotatable encoder section of the jog dial 4.

Further, a BIOS (Basic Input/Output System) 70G is written in the ROM 70. The BIOS is a basic input/output system and is used to control inputting/outputting of data between the OS or an application program and a peripheral equipment (display unit, keyboard, HDD or the like).

The RAM 71 includes registers for LED control, a touch pad input status, a key input status, and set times, an I/O register for supervision of a jog dial state, an IEEE 1394 I/F register and so forth as registers 71A to 71F. For example, the LED control register controls lighting of the message lamp ML for indicating an instantaneous startup state of an electronic mail when the jog dial 4 is depressed. The key input status register stores an operation key flag when the jog dial 4 is depressed. The set time register allows arbitrary setting of a certain time thereto.

Further, the jog dial 4, touch pad 6, keyboard 5, IEEE 1394 input/output port 101 and shutter button 105 are connected through respective connectors not shown to the embedded controller 68. When a user operates the jog dial 4, touch pad 6, keyboard 5 or shutter button 105, a signal corresponding to the operation is inputted from the jog dial 4, touch pad 6, keyboard 5 or shutter button 105 to the embedded controller 68, which thus outputs the signal to the ISA/EIO bus 63. Furthermore, the embedded controller 68 performs communication of data with an external apparatus through the IEEE 1394 input/output port 101. In addition, the lamps including the power supply lamp PL, battery lamp BL, message lamp ML and other LEDs and a power supply control circuit 73 are connected to the embedded controller 68.

The power supply control circuit 73 is connected to a built-in battery 74 or a commercial AC power supply and supplies necessary power to the individual blocks. The power supply control circuit 73 further controls charging of the built-in battery 74 and second batteries of peripheral equipments. The embedded controller 68 supervises the power supply switch 8 which is operated in order to turn power supply on or off.

The embedded controller 68 can normally execute the IEEE 1394 I/F program 70A to BIOS 70G with its internal power supply even when the power supply switch 8 is in an off state. In other words, the IEEE 1394 I/F program 70A to BIOS 70G normally operate also when no window is open on the LCD unit 7 of the display section 3. Accordingly, even if the power supply switch 8 is in an off state and the OS 54E is not operating with the CPU 51, the embedded controller 68 is normally operating the jog dial state supervision program 70F. Consequently, even if the notebook type personal computer 1 does not have a key for exclusive use, it has a programmable power key (PPK) function, and even if the notebook type personal computer 1 is in a power saving state or in a power off state, a user can start up desirable software or a desirable script file only by depression of the jog dial 4.

In order to input a command for starting up application software when the power supply switch 8 is in an on state, an icon representative of startup of, for example, photograph image management software may be displayed on the LCD unit 7 in advance so that it can be selected using the keyboard 5 or the touch pad 6 or a startup button may be provided on the keyboard 5.

Figure 6:
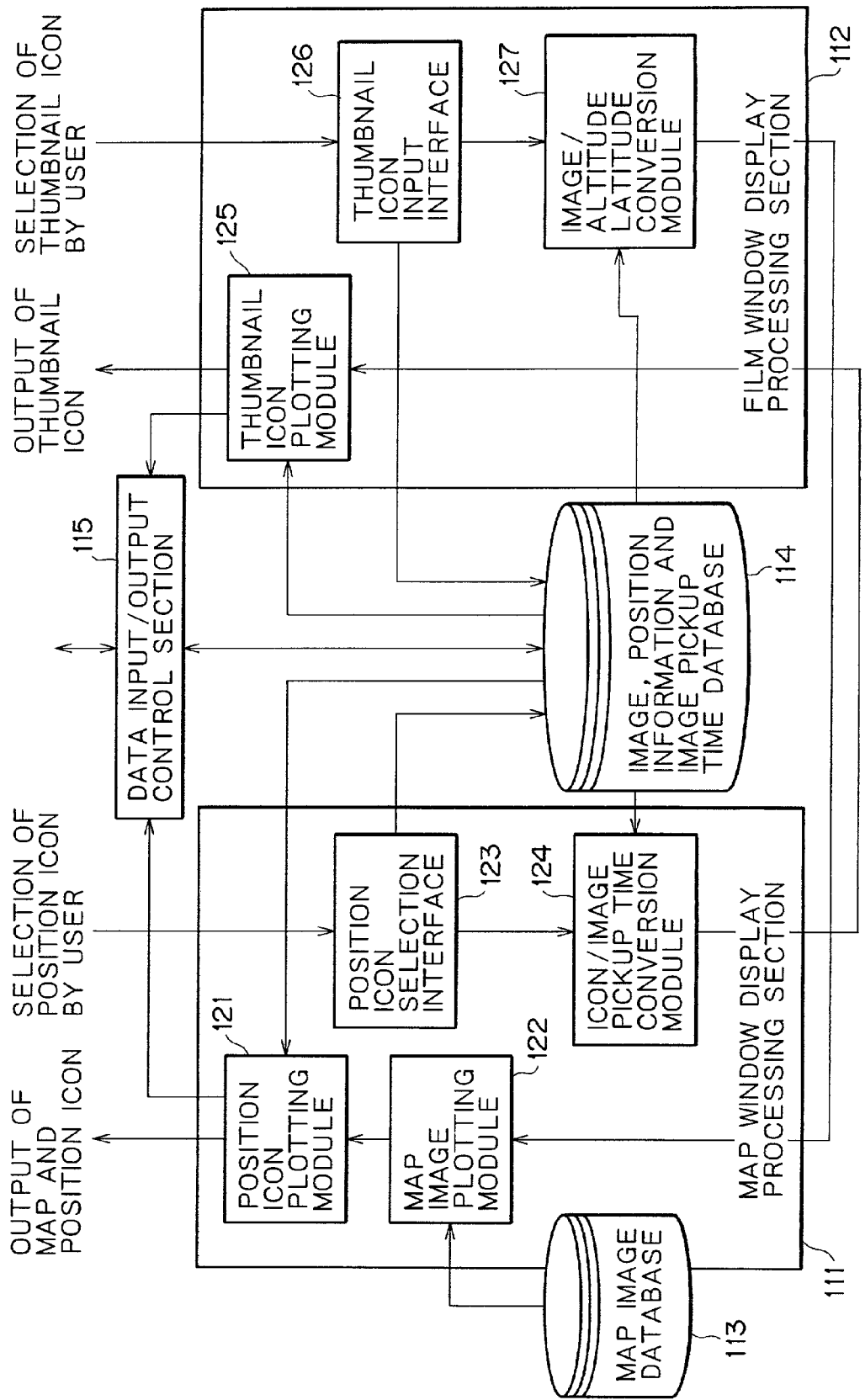
FIG. 6 is a functional block diagram showing functions of the personal computer of FIG. 1.

A functional block diagram when the CPU 51 of the personal computer 1 reads the photograph image management software into the RAM 54 and starts up the photograph image management software is shown in FIG. 6.

Referring to FIG. 6, a map window display processing section 111 controls the display of a map window that is hereinafter described with reference to FIG. 10. A film window display processing section 112 controls the display of a film window that is hereinafter described with reference to FIG. 10. A data input/output control section 115 controls such inputting and outputting processing of an image, position information and image pickup time database 114 as to, for example, input picked up image data to the image, position information and image pickup time database 114 and output, in order to cause the LCD unit 7 to display a message which may give assistance to an operation of a user, corresponding text data representative of the message.

Figures 7, 8:
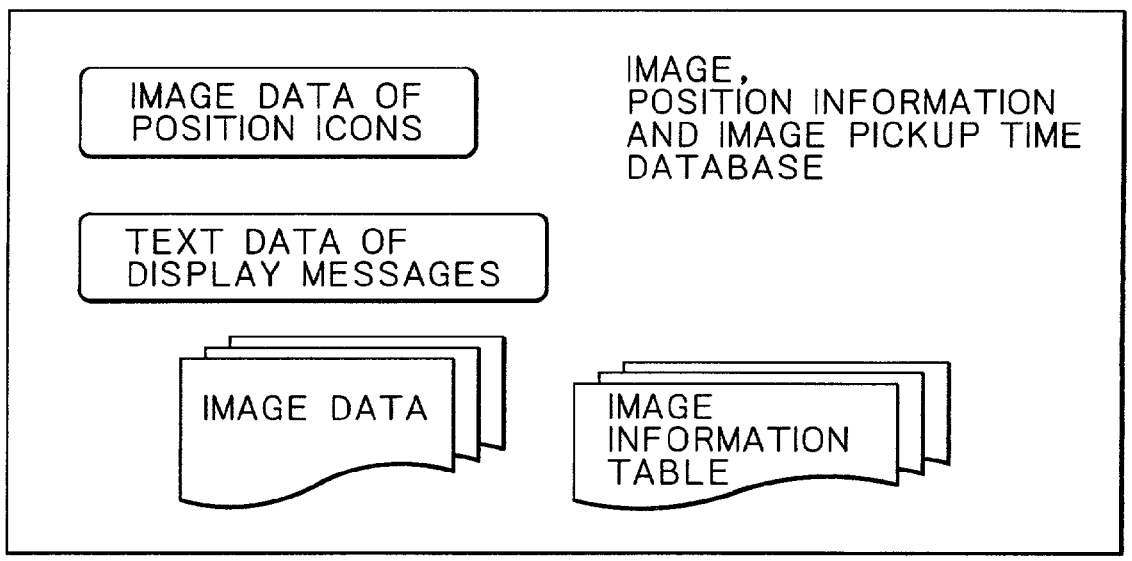
FIG. 7 is a diagrammatic view showing an example of information registered an image, position information and image pickup time database.
FIG. 8 is a diagrammatic view showing an example of an image information table.

FIG. 7 illustrates an example of contents of registration of the image, position information and image pickup time database 114. The image, position information and image pickup time database 114 has registered therein image data picked up by the CCD video camera 102, image data corresponding to position icons displayed in the map window, text data for allowing display of a message which may give assistance to an operation of a user and such image information tables as illustrated in FIG. 8.

Referring to FIG. 8, each of the image information tables has registered therein for each image data a thumbnail ID which is a unique ID, and data of an altitude and a latitude which are information representative of an image pickup place and an image pickup date and hour. For example, a thumbnail ID or an image pickup date and hour can be searched if an inquiry is issued to an image information table using an altitude and a latitude as a key. Further, an image data can be searched using the corresponding thumbnail ID. It is to be noted that the image information table may be modified so as to allow additional registration of necessary information such as, for example, the name of each image data or a comment.

Referring back to FIG. 6, the configurations of the film window display processing section 112 and the map window display processing section 111 are described.

Figure 10:
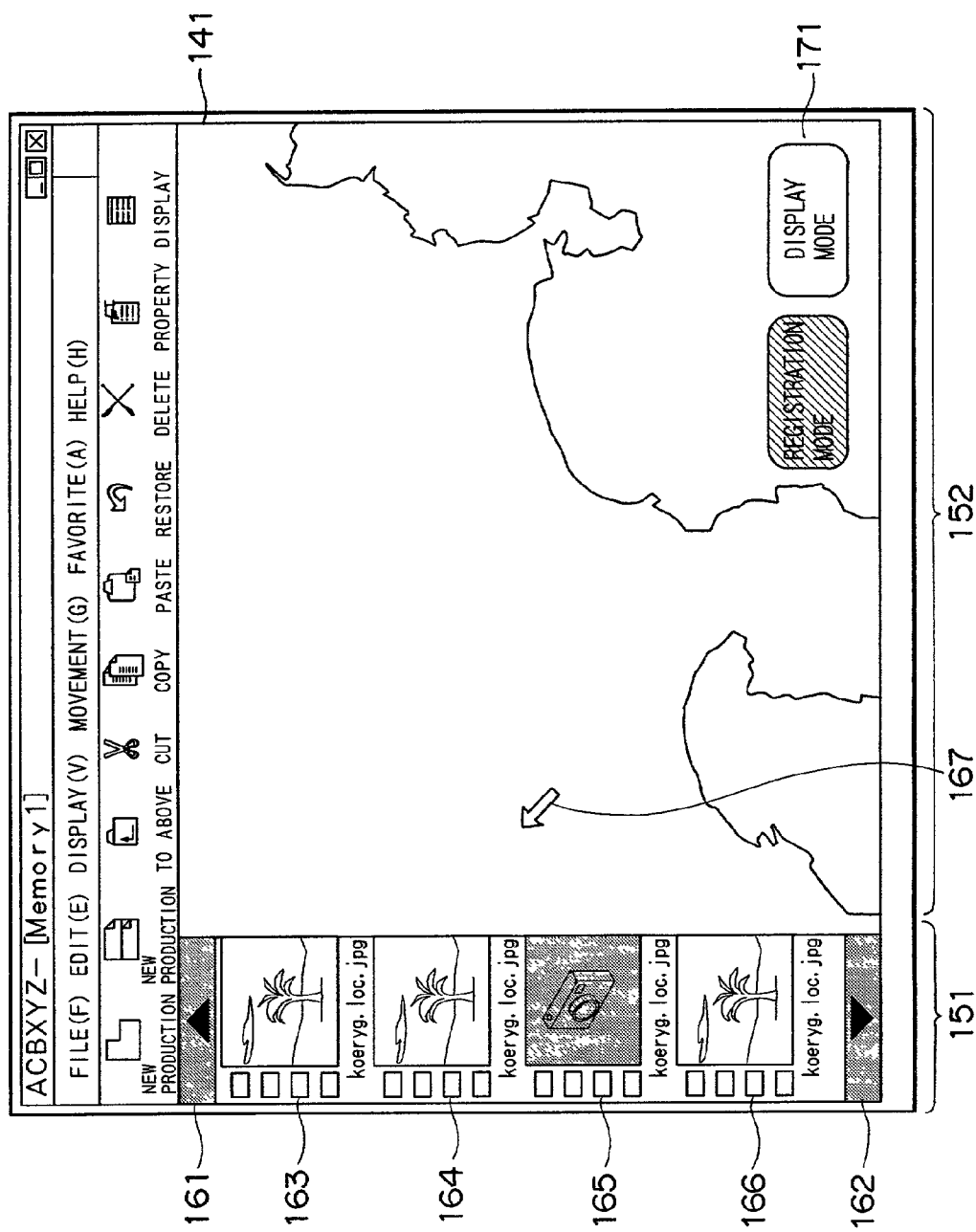
FIGS. 10 to 12 are schematic views showing different display screens.

If a thumbnail icon which is hereinafter described with reference to FIG. 10 is selected in a display mode by a user, then a signal representative of the selection of the user is inputted to a thumbnail icon input interface 126. The thumbnail icon input interface 126 determines a thumbnail ID corresponding to the thumbnail icon selected by the user in response to the inputted signal and outputs the thumbnail ID to an image/altitude latitude conversion module 127. The image/altitude latitude conversion module 127 uses the inputted thumbnail ID as a key to read out altitude and latitude information corresponding to the thumbnail icon selected by the user from the image, position information and image pickup time database 114 and outputs the altitude and latitude information to a map information plotting module 122 of the map window display processing section 111.

The map information plotting module 122 reads out an image of a map, in which the position given by the altitude and the latitude inputted from the image/altitude latitude conversion module 127 is positioned at the center of the display image, from a map image database 113 and outputs the image of the map to a position icon plotting module 121. The position icon plotting module 121 reads out image data corresponding to the position icon from the image, position information and image pickup time database 114 and outputs the image data of the position icon together with the position indicated by the altitude and the latitude inputted from the image/altitude latitude conversion module 127 and corresponding to the thumbnail icon selected by the user.

If one of position icons which are hereinafter described with reference to FIG. 10 is selected in the display mode by the user, then a signal representative of the selection of the user is inputted to a position icon selection interface 123. The position icon selection interface 123 determines an image pickup place (altitude and latitude) corresponding to the position icon selected by the user based on the inputted signal and inputs the image pickup place to an icon/image pickup time conversion module 124. The icon/image pickup time conversion module 124 uses the inputted image pickup place (altitude and latitude) as a key to read out image pickup time information corresponding to the position icon selected by the user from the image, position information and image pickup time database 114 and inputs the image pickup time information to a thumbnail icon plotting module 125 of the film window display processing section 112.

The thumbnail icon plotting module 125 reads out a predetermined number of image data picked up around the time inputted from the icon/image pickup time conversion module 124 from the image, position information and image pickup time database 114 and produces and outputs an image of a thumbnail icon with which an image corresponding to the selected position icon is displayed at the top position of the film window and later images are displayed in a time series.

If one of thumbnail icons which are hereinafter described with reference to FIG. 10 is selected in a registration mode by the user, then the thumbnail icon input interface 126 inputs a thumbnail ID corresponding to the thumbnail icon selected by the user based on the inputted signal to the image, position information and image pickup time database 114. Then, the data input/output control section 115 reads out a message for urging the user to input an image pickup position when image data corresponding to the thumbnail icon selected by the user does not have position information, that is, when current position data were not obtained upon image pickup of a photograph while signals from GPS satellites were received using the GPS antenna 108, from the image, position information and image pickup time database 114 and outputs the message. The data input/output control section 115 outputs the thus read message.

The user can start up, upon image pickup of a photograph, the photograph image management software, connect the GPS (Global Positioning System) antenna 108 to the USB port 107, receive radio waves from GPS satellites by means of the GPS antenna 108 and acquire and register image pickup position information into the image, position information and image pickup time database 114. Alternatively, the user can store position information received by the GPS antenna 108 into the RAM 54 through the USB port 107, south bridge 58 and PCI bus 56, start up the photograph image management software after image pickup of the photograph to read out the position information stored in the RAM 54 and register the position information into the image, position information and image pickup time database 114.

Further, the user can register image pickup position information into the image, position information and image pickup time database 114 by drag-and-drop of a corresponding thumbnail icon on a map displayed in the map window which is hereinafter described with reference to FIG. 10. The image pickup position of image data corresponding to the thumbnail icon is inputted to the position icon selection interface 123. The position icon selection interface 123 registers the image pickup position of the image data at a predetermined position of the image information table described hereinabove with reference to FIG. 8 based on the inputted signal. Then, the position icon plotting module 121 reads out altitude and latitude information from the image information table and outputs the image data with which a position icon is displayed at the predetermined position on the map.

The image pickup position may be inputted, for example, using the application $54H_2$. By the application $54H_2$, electronic map software is loaded, and the user is caused to input an address of the image pickup position. Then, the electronic map software is started up on the background to search for position data from the address, and the position data searched out is inputted to the predetermined position of the image information table described hereinabove with reference to FIG. 8. Alternatively, a position inputting method for inputting an image pickup position may be selected from among several inputting methods by a user. Further, the position of the position icon on a map may be varied by drag-and-drop. When the position icon is moved, contents of the change are inputted through the position icon selection interface 123 to the image, position information and image pickup time database 114, in which the altitude and latitude information of the data having the corresponding thumbnail ID is rewritten.

Now, a process of registering image data and various kinds of information corresponding to the image data into the image, position information and image pickup time database 114 by taking a photograph and starting up the photograph image management software is described with reference to a flow chart of FIG. 9.

In step S1, the CPU 51 controls the HDD 67 to fetch image data picked up by the CCD video camera 102 through the video controller 57, PCI bus 56, south bridge 58 and IDE bus 62. If the GPS antenna 108 is connected to the USB port 107 when the image data are picked up, then radio waves from GPS satellites can be received by the GPS antenna 108 to acquire current position data. The USB interface 106 outputs the current position data (altitude data, latitude data and height data) received from the GPS satellites through the GPS antenna 108 and the USB port 107 to the CPU 51 through the PCI bus 56, north bridge 53 and host bus 52. Consequently, the CPU 51 inputs the inputted current position data together with the image data to the HDD 67.

In step S2, the CPU 51 controls the HDD 67 to read in an image pickup date and hour from the timer circuit 60 through the IDE bus 62.

In step S3, the CPU 51 registers the image data inputted to the HDD 67, the data representative of the image pickup date and hour, and, where the GPS antenna 108 is connected to the USB port 107 in step S1, corresponding current position data into the image, position information and image pickup time database 114.

If the user selects an icon representative of startup, for example, of the photograph image management software displayed on the LCD unit 7 using the keyboard 5 or the touch pad 6 to input a command to start up the photograph image management software, then in step S4, the CPU 51 loads the photograph image management software stored in the HDD 67 into the RAM 54 and executes the photograph image management software so that a film window 151 and a map window 152 shown in FIG. 10 may be displayed on the LCD unit 7 through the north bridge 53, AGP 50 and video controller 57.

In particular, image data are read out from the image, position information and image pickup time database 114, and image data of the thumbnail icon are produced by and outputted from the thumbnail icon plotting module 125. Further, map image data are read out from the map image database 113, and a display image of a map is produced by the map information plotting module 122 and outputted through the position icon plotting module 121. The image data of the thumbnail icon and the map image data outputted are displayed on the LCD unit 7 through the north bridge 53, AGP 50 and video controller 57.

A display screen 141 is formed from the film window 151 and the map window 152. An upward scroll button 161, a downward scroll button 162 and thumbnail icons 163 to 166 for picked up image data are displayed in the film window 151. On an initial screen, the latest image data is displayed at the top position, and the other image data are displayed in order in a time series. By clicking the upward scroll button 161 or the downward scroll button 162 with a mouse cursor 167 or by dragging a thumbnail icon in an upward or downward direction in the film window 151, the display of thumbnail icons can be scrolled. Where no image data is registered, a thumbnail icon 165 representing that no image data is registered is displayed. Further, by double clicking a desired thumbnail icon, a corresponding photograph image can be displayed in an enlarged scale.

The position of the map window 152 on the display screen can be changed, for example, by dragging an arbitrary point on the map window 152 within the map window 152 or using a cursor key provided on the keyboard 5. Further, the scale of the display can be increased or decreased around the position of the mouse cursor 167 typically by continuously depressing the cursor key while a shift key of the keyboard 5 is kept depressed.

A pair of mode selection buttons 171 are displayed on the initial screen of the display screen 141. The photograph image management software provides a "registration mode" for registering image data picked up newly into the database, and a "display mode" for displaying image data registered already in association with map data. The "registration mode" or the "display mode" is selected alternatively by one of the mode selection buttons 171.

In step S5, the CPU 51 discriminates based on a signal inputted thereto through the embedded controller 68, ISA/EIO bus 63, south bridge 58, PCI bus 56, north bridge 53 and host bus 52 whether or not the registration mode is selected by the user who selectively operates that one of the mode selection buttons 171 of FIG. 10 which represents the registration mode. If it is discriminated in step S5 that the registration mode is not selected, that is, the display mode is selected, then a display process which is hereinafter described with reference to FIG. 13 is executed in step S6. Thereafter, the processing advances to step S14.

In step S7, the thumbnail icon input interface 126 discriminates based on a signal inputted thereto over the PCI bus 56 whether or not one of the thumbnail icons 163 to 166 is selected by the user using the touch pad 6 or the keyboard 5. If it is discriminated in step S7 that none of the thumbnail icons 163 to 166 is selected, then the processing in step S7 is repeated until it becomes discriminated that one of the thumbnail icons 163 to 166 is selected.

If it is discriminated in step S7 that one of the thumbnail icons 163 to 166 is selected, then in step S8, the thumbnail icon input interface 126 determines a thumbnail ID corresponding to the thumbnail icon selected by the user in accordance with the inputted signal and refers to the image, position information and image pickup time database 114 to discriminate whether or not the thumbnail icon corresponds to image data with which image pickup position information is not registered. If it is discriminated in step S8 that the thumbnail icon corresponds to image data with which image pickup position information is registered, then in step S9, the data input/output control section 115 reads out a display message of "The thumbnail icon is in register." from the image, position information and image pickup time database 114 and outputs the display massage through the north bridge 53, AGP 50 and video controller 57 to the LCD unit 7 so that the display message is displayed on the LCD unit 7. Then, the processing advances to step S13.

Figure 11:
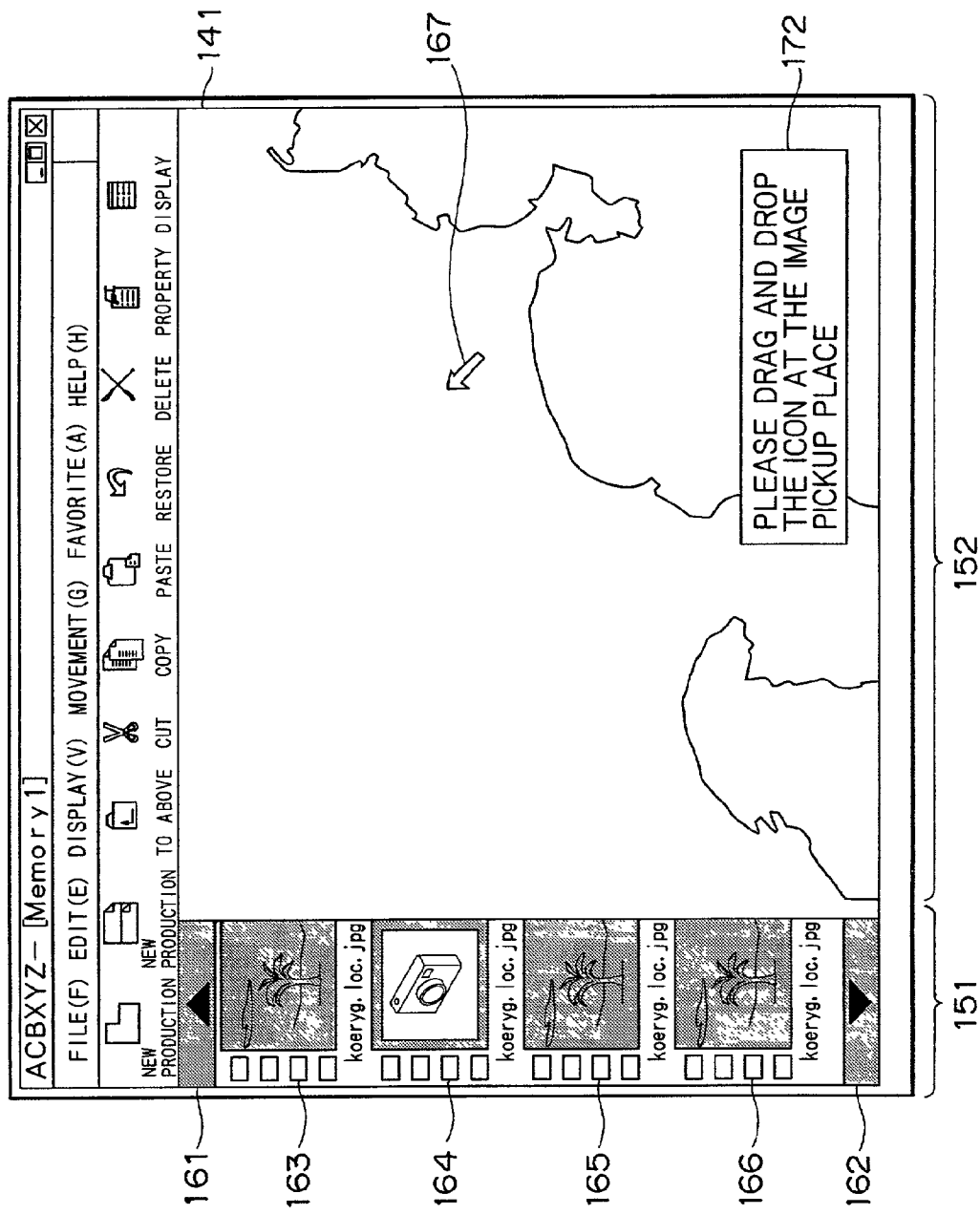

If it is discriminated in step S8 that the thumbnail icon corresponds to image data with which image pickup position information is not registered, then in step S10, the data input/output control section 115 reads out a display message of "Please drag and drop the icon at the image pickup place." from the image, position information and image pickup time database 114 and outputs the display message through the north bridge 53, AGP 50 and video controller 57 to the LCD unit 7 so that the display message is displayed on the LCD unit 7. A display image in this instance is shown in FIG. 11. The selected thumbnail icon 164 in this instance is displayed in highlight, and the display message is displayed in a message display portion 172.

If the user refers to the message displayed in step S10 to drag the selected thumbnail icon and moves and drops the mouse cursor 167 to and at a desired position of the map window 152, then a signal representative of the dropped position is inputted to the icon selection interface. In step S11, the icon selection interface determines an altitude and a latitude of the image pickup place from the inputted data and registers the altitude and the latitude of the image pickup place into the image, position information and image pickup time database 114.

In step S12, the position icon plotting module 121 reads out image data corresponding to the position icon and the information of the image pickup place registered newly in step S11 from the image, position information and image pickup time database 114 and controls the position icon to be displayed at the position of the newly registered image pickup place corresponding to the altitude and the latitude.

The position icon displayed on the map window 152 can be moved by drag-and-drop, and when the position icon is moved, a signal representative of the new display position is inputted to the position icon selection interface 123. Thus, new altitude and latitude information is registered into the image, position information and image pickup time database 114.

It is to be noted that it is also possible to represent a relationship between picked up image data more particularly, for example, by displaying the moving means (for example, walking, a bicycle, a car, a bus, an electric car, a ship, an aircraft or the like) of a user upon image pickup for photographs from a position indicated by a certain one of position icons 181 to 184 displayed in the map window 152 to a position indicated by a next position icon using a displaying manner (for example, the design, color, thickness, pattern or the like of a line) which is different among different moving means. For example, if photograph data picked up in a tour are recorded together with moving means, then the sightseeing course in the tour and the photographs can be arranged in a corresponding relationship. Also it is possible to inquire the image, position information and image pickup time database 114 for image pickup hours using an altitude and a latitude of a position icon as a key, calculate an average movement time from a distance indicated by the two position icons and the image pickup hours and display the most suitable moving means by default.

In step S13, the CPU 51 discriminates whether or not an instruction to end the registration mode is issued by the user. If it is discriminated in step S13 that an instruction to end the registration mode is not issued, then the processing returns to step S7 so that similar processing to that described above is repeated. However, if it is discriminated in step S13 that an instruction to end the registration mode is issued, then in step S14, the CPU 51 discriminates whether or not an instruction to end the photograph image management software is issued by the user.

If it is discriminated in step S14 that an instruction to end the photograph image management software is not issued, then the processing returns to step S4 so that similar processing to that described above is repeated. However, if it is discriminated in step S14 that an instruction to end the photograph image management software is issued, then the processing is ended.

Figure 12:
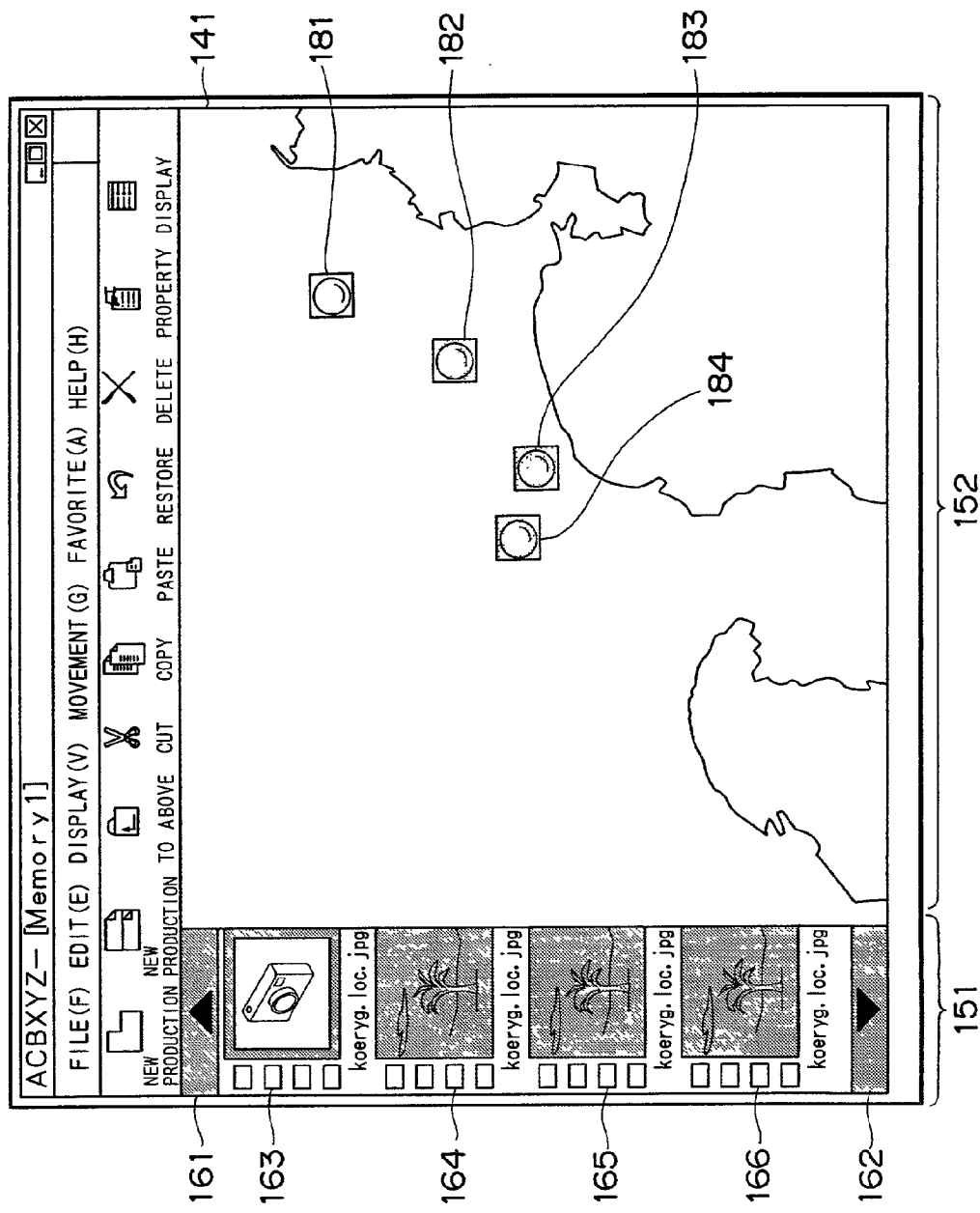

FIG. 12 shows an example of the display screen after a position icon is registered. The position icons 181 to 184 are displayed on the map window 152, and also the thumbnail icon 163 corresponding to the position icon 181 which is displayed in highlight is displayed in highlight.

Figure 9:
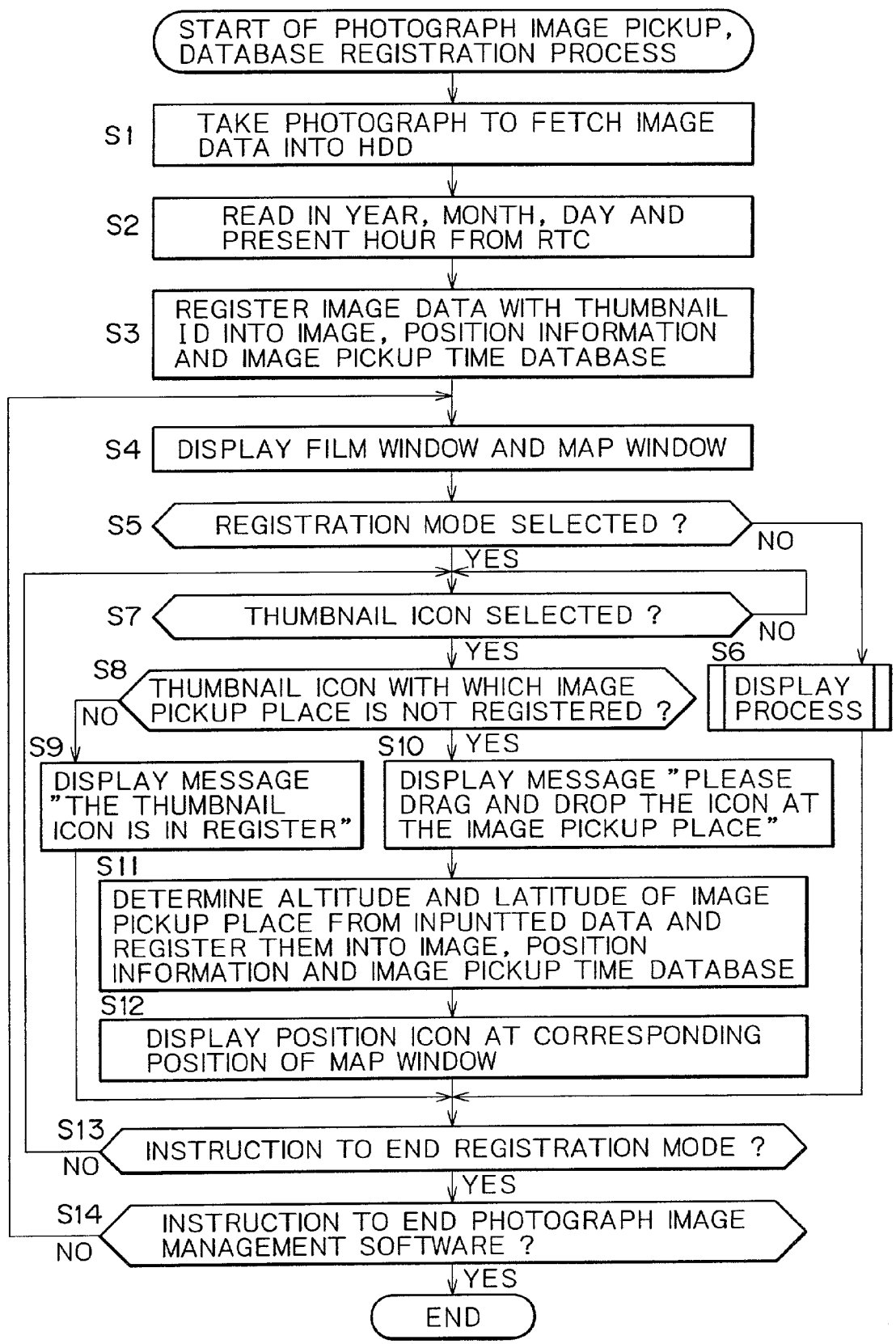
FIG. 9 is a flow chart illustrating a photograph image pickup, database registration process.

Now, the display process in step S6 of FIG. 9 is described with reference to a flow chart of FIG. 13.

In step S21, the position icon selection interface 123 discriminates whether or not one of the position icons 181 to 184 is selected based on a signal inputted through the embedded controller 68, ISA/EIO bus 63, south bridge 58, PCI bus 56 and north bridge 53 and representative of an operation performed by the user using the keyboard 5 or the touch pad 6.

If it is discriminated in step S21 that none of the position icons 181 to 184 is selected, then the processing advances to step S28. However, if it is discriminated in step S21 that one of the position icons 181 to 184 is selected, then in step S22, the position icon selection interface 123 determines an altitude and a latitude corresponding to the position icon designated by the user and inputs the altitude and the latitude to the icon/image pickup time conversion module 124.

In step S23, the icon/image pickup time conversion module 124 issues an inquiry to the image, position information and image pickup time database 114 using the altitude and the latitude inputted from the position icon selection interface 123 in step S22 as a key to request for an image pickup time of the picked up photograph, and outputs the image pickup time to the thumbnail icon plotting module 125 of the film window display processing section 112.

In step S24, the thumbnail icon plotting module 125 issues an inquiry to the image, position information and image pickup time database 114 using the inputted image pickup time as a key to request for thumbnail IDs of a predetermined number of image data picked up around the image pickup time to search for corresponding image data.

In step S25, the thumbnail icon plotting module 125 discriminates whether or not corresponding image data are searched out successfully. If it is discriminated in step S25 that corresponding image data are searched out successfully, then in step S26, the thumbnail icon plotting module 125 produces image data for displaying the thumbnail icon 163 corresponding to the image data picked up at the time corresponding to the position icon designated by the user in highlight at the top in the film window 151 of the display screen 141 and displaying the other thumbnail icons 164 to 166 in a time series, and outputs the produced image data through the north bridge 53, AGP 50 and video controller 57 to the LCD unit 7 so that the image data are displayed on the LCD unit 7. Then, the processing advances to step S34.

If it is discriminated in step S25 that the corresponding image data are not searched out successfully, then in step S27, the thumbnail icon plotting module 125 outputs a signal representing that the image data are not searched out successfully to the data input/output control section 115. The data input/output control section 115 receives the input of the signal, reads out text data corresponding to a message of "The photograph is not registered." from the image, position information and image pickup time database 114, and outputs the text data through the north bridge 53, AGP 50 and video controller 57 to the LCD unit 7 so that the message is displayed on the LCD unit 7. Then, the processing advances to step S34.

If it is discriminated in step S21 that none of the position icons 181 to 184 is selected, then in step S28, the thumbnail icon input interface 126 discriminates whether or not one of the thumbnail icons is selected based on a signal inputted through the embedded controller 68, ISA/EIO bus 63, south bridge 58, PCI bus 56 and north bridge 53, and representing an operation performed by the user using the keyboard 5 or the touch pad 6.

If it is discriminated in step S28 that none of the thumbnail icons is selected, then the processing returns to step S21 so that similar processing to that described above is repeated. On the other hand, if it is discriminated in step S28 that one of the thumbnail icons is selected, then in step S29, the thumbnail icon input interface 126 determines a thumbnail ID corresponding to the thumbnail icon designated by the user and inputs the thumbnail ID to the image/altitude latitude conversion module 127.

In step S30, the image/altitude latitude conversion module 127 issues an inquiry to the image, position information and image pickup time database 114 using the thumbnail ID inputted from the thumbnail icon input interface 126 in step S29 as a key to search for a corresponding image pickup place (altitude and latitude).

In step S31, the image/altitude latitude conversion module 127 discriminates whether or not an image pickup place (altitude and latitude) corresponding to the thumbnail icon selected by the user is searched out successfully. If it is discriminated in step S31 that an image pickup place is searched out successfully, then in step S32, the image/altitude latitude conversion module 127 outputs the searched out altitude and latitude to the map information plotting module 122. The map information plotting module 122 reads out, based on the inputted altitude and latitude, map image data around a place provided by the inputted altitude and the latitude from the map image database 113 and outputs the map image data to the position icon plotting module 121. The position icon plotting module 121 reads out image data corresponding to the position ion from the image, position information and image pickup time database 114, produces image data for displaying the image pickup place corresponding to the thumbnail icon designated by the user at the center and displaying the corresponding position icon in highlight in the map window 152 of the display screen 141, and outputs the image data through the north bridge 53, AGP 50 and video controller 57 to the LCD unit 7 so that the image data is displayed on the LCD unit 7. Then, the processing advances to step S34.

If it is discriminated in step S31 that an image pickup place is not searched out successfully, then in step S32, the position icon plotting module 121 outputs a signal representing that an image pickup place is not searched out successfully to the data input/output control section 115. The data input/output control section 115 receives the input of the signal, reads out text data corresponding to a message of "The image pickup place is not registered." from the image, position information and image pickup time database 114, and outputs the text data through the north bridge 53, AGP 50 and video controller 57 to the LCD unit 7 so that the message is displayed on the LCD unit 7.

In step S34, the CPU 51 discriminates whether or not an instruction to end the display mode is issued by the user. If it is discriminated in step S34 that an instruction to end the display mode is not issued, then the processing returns to step S21 so that similar processing to that described above is repeated. However, if it is discriminated in step S34 that an instruction to end the display mode is issued, then the processing advances to step S14 of FIG. 9.

As described hereinabove with reference to FIG. 13, the thumbnail icons 163 to 166 and the position icons 181 to 184 are displayed in a corresponding relationship to each other, and each of the image data indicated by the thumbnail icon 163 and 166 has information of an image pickup time. Therefore, the user can recognize readily when and where picked up and stored image data was picked up. Further, also where a plurality of photographs were taken at the same place, the corresponding relationship between the image pickup place indicated on a map and photograph image data can be represented simply and plainly. Also it is possible to search for picked up image data and the image pickup date and hour readily using an image pickup place as a key.

While the series of processes described above can be executed by hardware, it may otherwise be executed by software. Where the series of processes is executed by software, a program which constructs the software is installed from a program storage medium into a computer incorporated in hardware for exclusive use or, for example, a personal computer for universal use which can execute various functions by installing various programs.

The program storage medium for storing the program which is installed into and executed by a computer is formed as a package medium such as, as shown in FIG. 5, a magnetic disk 231 (including a floppy disk), an optical disk 232 (including a CD-ROM (Compact Disc-Read Only Memory) and a DVD (Digital Versatile Disc)), a magneto-optical disk 233 (including an MD (Mini-Disc)), a semiconductor memory, or a ROM 71 or a HDD 67 in or on which the program is recorded temporarily or permanently. Storage of the program onto the program storage medium is performed, when necessary, through the modem 75 or an interface such as a router making use of the Internet 80 or a wired or wireless communication medium such as a local area network or digital satellite broadcasting.

It is to be noted that, in the present application, the steps which describe the program stored in or on a program storage medium may be but need not necessarily be processed in a time series in the order as described, and include processes which are executed parallelly or individually without being processed in a time series.

While a preferred embodiment of the present invention has been described using specific terms, such description is for illustrative purposes only, and it is to be understood that changes and variations may be made without departing from the spirit or scope of the following claims.

What is claimed is:

1. An image displaying apparatus, comprising:
   image information displaying means for displaying icons of a first type representative of image information in an image information displaying area; and
   position information displaying means for displaying icons of a second type representative of position information relative to a point on a geographical map displayed in a position information displaying area; wherein
   said image information displaying means changes display of an icon of the first type if the icon of the first type corresponds to a selected icon of the second type, and
   said position information displaying means changes display of an icon of the second type if the icon of the second type corresponds to a selected icon of the first type.

2. An image displaying apparatus according to claim 1, wherein
   both said image information and said position information each of which has attribute data of time, and both said image information displaying means and said position information displaying means specify a corresponding relationship between said icons of the first type and said icons of the second type using said attribute data of time as a parameter.

3. A method for displaying image information, comprising steps of:
   displaying icons of a first type representative of image information in an image information displaying area;
   displaying icons of a second type representative of position information relative to a point on a geographical map displayed in a position information displaying area;
   changing display of an icon of the first type if the icon of the first type corresponds to a selected icon of the second type; and
   changing display of an icon of the second type if the icon of the second type corresponds to a selected icon of the first type.

4. A computer program product having computer readable instructions contained therein that when executed by a processor are configured to implements steps of:
   displaying icons of a first type representative of image information in an image information displaying area;
   displaying icons of a second type representative of position information relative to a point on a geographical map displayed in a position information displaying area;
   changing display of an icon of the first type if the icon of the first type corresponds to a selected icon of the second type; and
   changing display of an icon of the second type if the icon of the second type corresponds to a selected icon of the first type.

5. An image displaying apparatus, comprising:
   storage means for storing image data;
   first recording means for recording time information in a corresponding relationship to the image data;

second recording means for recording position information in a corresponding relationship to the image data;

first display control means for controlling display of first icons representative of the image data stored in said storage means in accordance with the time information recorded by said first recording means in image information displaying area;

second display control means for controlling display of a geographical map image in position information displaying area; and third display control means for controlling display of second icons representative of the position information recorded by said second recording means on the geographical map image whose display is controlled by said second display control means, wherein when one of the first icons whose display is controlled by said first display control means is selected, said second display control means changes the display of the geographical map image based on the position information of the image data corresponding to the selected first icon recorded by said second recording means in said position information displaying area and said third display control means changes the display of the second icons corresponding to the selected first icon, and said first display control means changes, when one of the second icons whose display is controlled by said third display control means is selected, the display of the first icons based on the time information of the image data corresponding to the selected second icon recorded by said first recording means in said image information displaying area.

6. An image displaying method, comprising steps of:

storing image data in a storage means;

recording time information via a first recording means in a corresponding relationship to the image data;

recording position information via a second recording means in a corresponding relationship to the image data;

controlling via a first display control means a display of first icons representative of the image data stored in said storage means in accordance with the time information recorded by said first recording means in image information displaying area;

controlling via a second display control means a display of a geographical map image in position information displaying area; and controlling via a third display control means a display of second icons representative of the position information recorded by said second recording means on the geographical map image whose display is controlled by said second display control means, wherein when one of the first icons whose display is controlled by said first display control means is selected, said second display control means changes the display of the geographical map image based on the position information of the image data corresponding to the selected first icon recorded by said second recording means in said position information displaying area and said third display control means changes the display of the second icons corresponding to the selected first icon, and said first display control means changes, when one of the second icons whose display is controlled by said third display control means is selected, the display of the first icons based on the time information of the image data corresponding to the selected second icon recorded by said first recording means in said image information displaying area.

7. A computer program product having computer readable instructions contained therein that when executed by a processor are configured to implements steps of:

storing image data in a storage means;

recording time information via a first recording means in a corresponding relationship to the image data;

recording position information via a second recording means in a corresponding relationship to the image data;

controlling via a first display control means a display of first icons representative of the image data stored in said storage means in accordance with the time information recorded by said first recording means in image information displaying area;

controlling via a second display control means a display of a geographical map image in position information displaying area; and controlling via a third display control means a display of second icons representative of the position information recorded by said second recording means on the geographical map image whose display is controlled by said second display control means, wherein when one of the first icons whose display is controlled by said first display control means is selected, said second display control means changes the display of the geographical map image based on the position information of the image data corresponding to the selected first icon recorded by said second recording means in said position information display area and said third display control means changes the display of the second icons corresponding to the selected first icon, and said first display control means changes, when one of the second icons whose display is controlled by said third display control means is selected, the display of the first icons based on the time information of the image data corresponding to the selected second icon recorded by said first recording means in said image information displaying area.

8. An image displaying apparatus, comprising:

an image information displaying unit configured to display icons of a first type representative of image information in an image information displaying area; and a position information displaying unit configured to display icons of a second type representative of position information relative to a point on a geographical map displayed in a position information displaying area; wherein said image information displaying unit changes display of an icon of the first type if the icon of the first type corresponds to a selected icon of the second type, and said position information displaying unit changes display of an icon of the second type if the icon of the second type corresponds to a selected icon of the first type.

9. An image displaying apparatus, comprising:

a storage unit configured to store image data;

a first recording unit configured to record time information in a corresponding relationship to the image data;

a second recording unit configured to record position information in a corresponding relationship to the image data;

a first display control unit configured to control display of first icons representative of the image data stored in said storage unit in accordance with the time information recorded by said first recording unit in image information displaying area;

a second display control unit configured to control display of a geographical map image in position information displaying area; and a third display control unit configured to control display of second icons representative of the position information recorded by said second recording unit on the geographical map image whose display is controlled by said second display control unit, wherein when one of the first icons whose display is controlled by said first display control unit is selected, said second display control unit changes the display of the geographical map image based on the position information of the image data corresponding to the selected first icon recorded by said second recording unit in said position information displaying area and said third display control unit changes the display of the second icons corresponding to the selected first icon, and said first display control unit changes, when one of the second icons whose display is controlled by said third display control unit is selected, the display of the first icons based on the time information of the image data corresponding to the selected second icon recorded by said first recording unit in said image information displaying area.

* * * * *